United States Patent [19]
Stadler

[11] Patent Number: 6,073,495
[45] Date of Patent: Jun. 13, 2000

[54] MEASURING AND OPERATING CIRCUIT OF A CORIOLIS-TYPE MASS FLOW METER

[75] Inventor: Dietmar Stadler, Rheinfelden-Beuggen, Germany

[73] Assignee: Endress + Hauser Flowtec AG, Reinach, Switzerland

[21] Appl. No.: 09/039,607

[22] Filed: Mar. 16, 1998

Related U.S. Application Data

[60] Provisional application No. 60/044,050, Apr. 22, 1997.

[30] Foreign Application Priority Data

Mar. 21, 1997 [EP] European Pat. Off. .............. 97810169
Jul. 9, 1998 [EP] European Pat. Off. .............. 98810174

[51] Int. Cl.⁷ ...................................................... G01F 1/84
[52] U.S. Cl. ................................ 73/861.356; 73/861.357; 73/32 A
[58] Field of Search ....................... 73/861.356, 871.357, 73/861.355, 32 A

[56] References Cited

U.S. PATENT DOCUMENTS

| | | |
|---|---|---|
| 4,127,028 | 11/1978 | Cox et al. . |
| 4,793,191 | 12/1988 | Flecken et al. . |
| 4,801,897 | 1/1989 | Flecken . |
| 4,852,409 | 8/1989 | Herzl . |
| 4,895,030 | 1/1990 | Bergamini et al. . |
| 4,934,196 | 6/1990 | Romano . |
| 4,996,871 | 3/1991 | Romano . |
| 5,052,231 | 10/1991 | Christ et al. . |
| 5,429,002 | 7/1995 | Colman . |
| 5,531,126 | 7/1996 | Drahm . |
| 5,557,973 | 9/1996 | Koudal et al. . |
| 5,578,764 | 11/1996 | Yokoi et al. . |
| 5,610,342 | 3/1997 | Wenger et al. . |
| 5,648,616 | 7/1997 | Keel . |
| 5,675,093 | 10/1997 | Young et al. . |
| 5,705,754 | 1/1998 | Keita et al. . |
| 5,767,665 | 6/1998 | Morita et al. ........................ 324/76.52 |
| 5,827,979 | 10/1998 | Schott et al. ....................... 73/861.357 |
| 5,844,408 | 12/1998 | Yoshimura et al. ................. 324/76.52 |

FOREIGN PATENT DOCUMENTS 0 702 212  3/1996  European Pat. Off. .

*Primary Examiner*—Harshad Patel
*Attorney, Agent, or Firm*—Bose McKinney & Evans LLP

[57] ABSTRACT

In order to raise the measuring accuracy of a Coriolis-type mass flow rate meter in a cost-effective fashion, the latter comprises a measuring tube (4), a subcircuit measuring circuit and a subcircuit exciting circuit. Two vibration sensors (17, 18) and a vibration exciting (16) are arranged on the measuring tube. The vibration sensor (17) is assigned the amplifier (v1) in the subcircuit measuring circuit, and the vibration sensor (18) is assigned the amplifier (v2). Downstream of the two amplifiers are the summing stage (ss1) with a downstream integrating stage (ig), and the difference stage (ds). Downstream of the integrating stage (ig), the difference stage and the amplifier (v1) are the A/D converters (aw1, aw2, aw3), following which the digital processor (dp) is connected; it supplies the digital mass signal (m) and/or the digital density signal (d), as well as the gain control signal (v) for the amplifier (v2). The subcircuit exciting circuit contains the digital generator (dg), which supplies the digital exciting signal at the output (a1). The digital frequency controller (fr) is connected on the input side to the digital generator and to the digital processor, and on the output side to the frequency control input of the digital generator. The digital amplitude controller (ar1) is connected on the input side to the output (a5) of the digital processor, and on the output side to the amplitude control input of the digital generator.

5 Claims, 8 Drawing Sheets

MEASURING AND OPERATING CIRCUIT OF A CORIOLIS-TYPE MASS FLOW METER

This application claims the benefit of U.S. Provisional No. 60/044,050 filed Apr. 22, 1997.

FIELD OF THE INVENTION

The invention relates to a measuring and operating circuit of a Coriolis-type mass flow meter.

BACKGROUND OF THE INVENTION

Such mass flow meters are known to have at least one measuring tube which is excited to mechanical vibrations, is flowed through by a fluid to be measured and can be bent or straight; details on this are specified below in conjunction with the explanation of FIG. 1.

Usually, at least one vibration exciter as well at least two vibration sensors are arranged on the measuring tube, the latter spaced apart from one another in the flow direction. The measuring tube mostly vibrates at a mechanical resonant frequency which is prescribed by its material and its dimensions but is varied by the density of the fluid. In other cases, the vibration frequency of the measuring tube is not exactly at the mechanical resonant frequency of the latter but in the vicinity of said frequency.

The vibration sensors generate analog sensor signals whose frequency is equal to the vibration frequency of the measuring tube and which are mutually phase-shifted. A measuring subcircuit fed by the sensor signals supplies a signal proportional to the mass flow rate, and a exciting subcircuit feeds the vibration exciter with alternating energy whose frequency is usually equal to the instantaneous vibration frequency of the measuring tube.

U.S. Pat. No. 4,801,897 describes a exciting subcircuit which is in the manner of an analog phase-locked loop, that is to say the frequency of the alternating energy adjusts itself automatically to the instantaneous mechanical resonant frequency varied by the density of the fluid.

Conventional measuring subcircuits are either circuits which are analog and thus operate in the time domain such as, for example, the measuring circuit described in EP-A 698 783, which corresponds to the U.S. application Ser. No. 08/514,914 of Aug. 14, 1995, or in U.S. Pat. No. 4,895,030, or digital circuits such as, for example, the measuring circuit described in U.S. Pat. Nos. 4,934,196, 4,996,871, 5,052,231, 5,429,002 or in EP-A 702 212.

Concerning the measuring circuit described in EP-A 698 783, the only point of interest for the invention—because it has recourse thereto—is that, inter alia, it contains an analog control circuit which controls the sensor signals to equal amplitudes.

The measuring circuit described in U.S. Pat. No. 4,895,030 subjects a sum signal formed from the two sensor signals and a difference signal formed from the two sensor signals to separate analog filtering based on an analog Fourier transformation, and then forms the signal proportional to the mass flow rate from the signals thus filtered.

The measuring circuit described in U.S. Pat. No. 5,052,231 subjects each sensor signal to amplification, then to respective anti-alias filtering, thereupon to respective amplifying sampling/holding, thereupon to respective analog-to-digital conversion and finally to respective discrete Fourier transformation. A digital signal proportional to the mass flow rate is calculated from the digital signals thus formed in accordance with a specific algorithm by means of a microprocessor. In this processing, the frequency of a sampling signal controlling the abovementioned sampling/holding must once again be equal to an integral multiple of the mechanical resonant frequency of the measuring tube.

The measuring circuit described in U.S. Pat. No. 5,429,002 subjects each sensor signal to sampling/holding, thereafter to respective analog-to-digital conversion and, finally, to respective digital processing which realizes the principle of the least-squares sine fit.

According to the measuring circuit described in EP-A 702 212, each sensor signal and a sum signal formed therefrom are subjected to respective anti-alias filtering, thereafter to respective analog-to-digital conversion, thereafter to respective bandpass filtering and, finally, to respective discrete Fourier transformation.

A digital signal proportional to the mass flow rate is calculated according to a specific algorithm from the digital signals thus formed. Here, as well, the frequency of a sampling signal controlling the abovementioned sampling/holding must again be equal to an integral multiple of the mechanical resonant frequency of the measuring tube.

In the measuring circuits so far referred to, it has been more or less tacitly assumed that the information on the value of the instantaneous resonant frequency of the measuring tube, that is to say essentially the information on its numerical value, is always available on the analog side of the circuit or can be determined easily on this side, so that the value of this variable can be, if necessary, incorporated into the formation of the signal or digital signal proportional to the mass flow rate. Thus, the instantaneous resonant frequency can be determined, for example in the arrangement according to the abovementioned U.S. Pat. No. 5,429,002, by means of a zero-crossing detector.

However, this is not the case in the measuring circuits described in U.S. Pat. Nos. 4,934,136 and 4,996,871, rather, this frequency information is generated only on the digital side. In these measuring circuits, each sensor signal is subjected to anti-alias filtering, thereafter to respective sampling/holding, thereafter to analog-to-digital conversion and, finally, to respective discrete Fourier transformation.

A digital signal proportional to the mass flow rate is calculated according to a specific algorithm from the digital signals thus formed by means of a microprocessor. The frequency of a sampling signal controlling the abovementioned sampling/holding is—as previously mentioned—no longer equal to an integral multiple of the mechanical resonant frequency of the measuring tube, but is selected arbitrarily.

The information on the instantaneous value of the mechanical resonant frequency of the measuring tube is obtained by virtue of the fact that the microprocessor determines the maximum of the power spectrum of the Fourier-transformed digital signals, and the frequency belonging to this maximum, which is equal to the resonant frequency.

Although said U.S. Pat. Nos. 4,934,196 and 4,996,871 describe a Coriolis-type mass flow meter with extensive digital circuits, only an analog exciting subcircuit is then explained with the aid of their respective FIG. 4.

SUMMARY OF THE INVENTION

The individual proposals, referred to above, from the prior art do serve in each case to improve the accuracy of measurement and/or to improve insensitivity to interfering mechanical vibrations which, for example, originate from the pipeline into which the mass flow meter is inserted, or which can be produced because of its mechanical design, and/or to improve insensitivity to electronic interference signals.

However, as research by the inventor has shown, mass flow meters according to the above prior art are not yet able to cope with the accuracy requirements as presently expected by the market.

This accuracy is essentially determined by the accuracy with which the phase shift, explained above, between the sensor signals can be measured. It has proved that the accuracy of this measurement of the phase shift is still inadequate when use is made of discrete Fourier transformation according to the prior art.

The reason for this is chiefly that interference signals contained in the sensor signals cannot be adequately suppressed by means of Fourier transformation. Specifically, this would be possible only if the frequency of the sampling signal is coupled to the frequency of the interference signals.

In addition, the required coupling, as accurate as possible, of the frequency of the sampling signal to the vibration frequency of the measuring tube can be realized only at great expense.

It has proved, furthermore, that measuring the phase shift according to the principle of the abovementioned least mean square sine fit is, for similar reasons, too inaccurate for Coriolis-type mass flow meters.

It is therefore one object of the invention to further improve the accuracy of Coriolis-type mass flow meters, and this is to be achieved, in particular, by raising the accuracy of measurement of the phase shift of the sensor signals. It goes without saying that the aim in so doing is a realization which is as cost effective as possible.

In order to solve the set of problems outlined above, the invention therefore consists in a measuring and operating circuit of a Coriolis-type mass flow meter having a mass flow sensor which has at least one measuring tube
  through which a fluid to be measured flows,
  which vibrates in operation at a vibration frequency which is prescribed by its material and its dimensions but varied by the density of the fluid and which is equal to the instantaneous mechanical resonant frequency of the measuring tube or adjacent to this frequency,
  on which there are arranged a first and a second electromagnetic vibration sensor, spaced apart from one another in the flow direction, as well as a vibration exciter, and
  which is surrounded by a support frame or a support tube,
having a measuring subcircuit which comprises:
  a first amplifier having a gain permanently set and amplifying the signal of the first vibration sensor,
  a second amplifier having a gain control input and amplifying the signal of the second vibration sensor,
  a first summing stage for the output signals of the first and second amplifiers,
  an integrating stage which follows the first summing stage and whose output signal is phase-shifted by 90° with respect to the output signal of the first summing stage,
  a difference stage for the output signals of the first and second amplifiers,
  a first analog-to-digital converter following the integrating stage,
  a second analog-to-digital converter following the difference stage,
  a third analog-to-digital converter following the first amplifier,
  a clock oscillator for generating a sampling signal which synchronously clocks the first, second and third analog-to-digital converters,
  a digital processor which is follos the first, second and third analog-to-digital converters and which generates a digital mass flow rate signal at a first output and/or a digital density signal at a second output as well as a gain control signal at a third output,
    which is fed to a first digital-to-analog converter whose output is connected to the gain control input of the second amplifier, and
having a exciting subcircuit which comprises:
  a digital generator
    having a frequency control input,
    having an amplitude control input,
    having a first output for a digital exciting signal,
    having a second output for a digital first sine signal,
    having a third output for a digital first cosine signal, and
    having a fourth output, for a digital signal representing the instantaneous vibration frequency,
    which is connected to an input of the digital processor,
  a digital frequency controller
    having a first input, which is connected to the second output of the digital generator,
    having a second input, which is connected to the fourth output of the digital processor, and
    having an output which is connected to the frequency control input of the digital generator,
  a first digital amplitude controller
    having a first input, which is connected to a fifth output of the digital processor,
    having a second input, which is fed a digital amplitude-setting signal, and
    having an output which is connected to the amplitude control input of the digital generator, and
  a second digital-to-analog converter,
    which follows the first output of the digital generator, and
    which drives an analog output stage feeding the vibration exciter.

According to a first development of the invention, the digital processor comprises:
  a first, a second and a third digital bandpass filter, which follows the first, second and third analog-to-digital converters, respectively which are all of identical design, whose lower and upper cut-off frequency is lower than the lowest and higher than the highest occurring frequency of the vibrations of the measuring tube, respectively, and which deliver output signals which contain a digital signal representing the value of the instantaneous mechanical vibration frequency,
  a first digital amplitude-measuring stage following the third bandpass filter and having an output at which a digital signal occurs which is constant as long as the amplitude of the output signal of the third bandpass filter is constant, and which is identical to this amplitude,
  a first digital 90°-phase-shifting and normalizing stage following the first bandpass filter,
  a second digital 90°-phase-shifting and normalizing stage following the third bandpass filter,
  a digital phase meter
    having a first input, which follows the first amplitude-measuring stage, having a second input, which follows the second bandpass filter, and having a third input, which follows the second 90°-phase-shifting and normalizing stage, a second digital amplitude controller having a first input, which follows the first 90°-phase-shifting and normalizing stage, having a second input, which is connected to the output of the second bandpass filter, and having an output, which is connected to the input of the first digital-to-analog converter, and an arithmetic stage for calculating the mass flow rate signal and/or the density signal having a first input which is connected to the output of the phase meter, having a second input, which is connected to the fourth output of the digital generator, having a first output, at which the digital mass flow rate signal can be tapped, and having a second output, at which the digital density signal can be tapped.

According to a second development of the invention, which can also be applied in the first development, the mass flow rate sensor comprises a first temperature sensor for measuring the temperature of the measuring tube, and a second temperature sensor for measuring the temperature of the support tube or of the support frame, and the measuring and operating circuit further comprises:

a first and a second reference resistor, a second summing stage from which a first input/output path is inserted between the first amplifier and the third analog-to-digital converter, a generator for an analog sine signal whose frequency is outside the vibration frequency range of the measuring tube or of the measuring tubes, and which is followed by a resistor, a multiplexer for switching through, in a fashion cyclically clocked by a clock generator, the first and second temperature sensors as well as the first and second reference resistors to a second input of the second summing stage, thereby forming a respective voltage divider with the resistor, a narrow-band fourth digital bandpass filter, which follows the output of the third analog-to-digital converter and whose passband comprises the frequency of the analog sine signal, a second digital amplitude-measuring stage, having a signal input which follows the fourth bandpass filter, and having an output at which a digital signal occurs which is constant as long as the amplitude of the output signal of the fourth bandpass filter is constant and which is identical to this amplitude, and a temperature signal separator stage, of which a signal input is connected to the output of the second amplitude-measuring stage, of which a control input is connected to the output of the clock generator, having a first output, at which a digital signal corresponding to the temperature measured by the first temperature sensor occurs and which is connected to a third input of the arithmetic stage, and having a second output, at which a digital signal corresponding to the temperature measured by the second temperature sensor occurs and which is connected to a fourth input of the arithmetic stage, at whose first output a temperature-compensated digital mass flow rate signal can be tapped, and at whose second output a temperature-compensated digital density signal can be tapped.

A third development of the invention, which augments the second development with additional features, comprises:

a third summing stage, from which a first input/output path is inserted between the difference stage and the second analog-to-digital converter and of which a second input is connected to the output of the multiplexer, a fifth digital bandpass filter, which connected to the output of the second analog-to-digital converter and whose design is identical to that of the fourth bandpass filter, a third digital amplitude-measuring stage, having a signal input which is follows the fifth bandpass filter, and an asymmetry-measuring stage having a dividend input connected to the output of the third amplitude-measuring stage, having a divisor input connected to the output of the second amplitude-measuring stage, and having an output connected to a fourth input of the phase meter.

An advantage of the invention consists in that the accuracy with which the phase shift between the sensor signals, as explained, can be measured is substantially improved with respect to the various prior art arrangements discussed above. Likewise, the insensitivity to interference frequencies, which can originate from the abovementioned pipeline, for example, is substantially higher than in the case of the arrangements according to the prior art.

A further advantage of the invention consists in that the information on the instantaneous vibration frequency of the measuring tube or of the measuring tubes is automatically available in a digital section of the measuring and operating circuit and does not have to be formed only from the sensor signals, as is the case in the prior art explained, since the exciting subcircuit almost completely comprises digital circuits; see below for details on this.

BRIEF DESCRIPTION OF THE DRAWINGS

The invention and further advantages are now explained in more detail with the aid of exemplary embodiments, which are represented in the FIGS. of the drawing, in which.

DETAILED DESCRIPTION OF THE DRAWINGS

Figure 1:
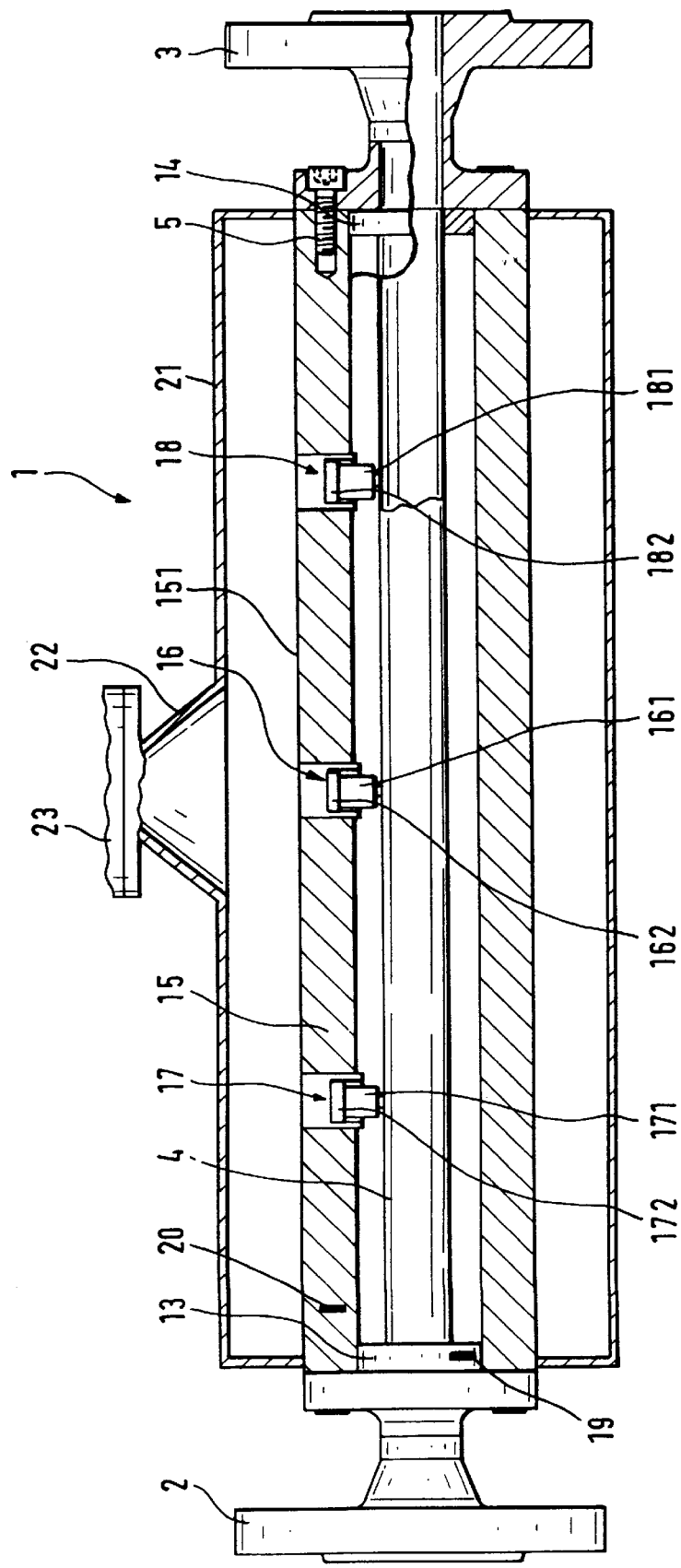
FIG. 1 shows a vertical, partially sectioned longitudinal view of a mass flow sensor of a mass flow meter having a measuring tube.

In FIG. 1, a mass flow sensor 1 of a mass flow meter is shown in a vertical, partially sectioned longitudinal view. This meter is suitable for the measuring and operating circuit according to the invention and is to be inserted, for exam-ple via flanges 2, 3, into the course of a pipeline of given diameter, through which a fluid to be measured flows but which, for reasons of clarity, is not represented.

The mass flow sensor 1 of FIG. 1 has a single straight measuring tube 4 whose end at the fluid inlet side is fixed to the flange 2, for example via an end plate 13 on the fluid inlet side, and whose end on the fluid outlet side is fixed to the flange 3, for example via an end plate 14 on the fluid outlet side. A measuring tube 4 is fitted tightly, in particular in a vacuum-tight fashion, into the end plates 13, 14, for example being welded in, soldered in or rolled in; compare U.S. Pat. No. 5,610,342 concerning the latter.

The measuring and operating circuit of the invention can also be used in the case of a Coriolis-type mass flow sensor with a single measuring tube, which has a cantilever mass according to the U.S. Provisional Applications Ser. Nos. 60/32,906 and 60/036,192 filed on Dec. 16, 1996 and Jan. 21, 1997, respectively and the commonly copending Non-Provisional Application, filed on Sep. 30, 1997.

Instead of a single straight measuring tube, the mass flow sensor of the mass flow meter can also have a single bent measuring tube extending in one plane, for example a measuring tube in the shape of a sector of a circle according to the U.S. Pat. No. 5,705,754.

Also possible, however, is a plurality of, in particular two, straight measuring tubes as described in U.S. Pat. No. 4,793,191, or a plurality of, in particular two, bent measuring tubes as described in U.S. Pat. No. 4,127,028.

Furthermore, the measuring and operating circuit of the invention can also be used in a mass flow sensor with a measuring tube and a dummy tube according to U.S. Pat. No. 5,531,126.

Finally, the measuring and operating circuit of the invention can also be applied in mass flow meters whose mass flow sensors have at least one helical measuring tube according to U.S. Pat. No. 5,557,973 or to U.S. Pat. No. 5,675,093.

The flanges 2, 3 and the end plates 13, 14 are mounted on or in a support tube 15. In FIG. 1, the flanges 2, 3 are fixed to the support tube 15 by screws, of which one screw 5 is to be seen fully in section at top right. The end plates 13, 14 can be welded or soldered to the inner wall of the support tube 15 tightly, in particular in a vacuum-tight fashion. However, it is also possible to design the support tube 15 and end plates 13, 14 in one piece.

Provided as means which excite the measuring tube 4 to vibrations, in particular to resonant vibrations, preferably to resonance flexural vibrations, is an, for example, electro-magnetic vibration exciter 16 which is arranged in the middle between the flanges 2, 3 and the end plates 13, 14 as well as in the interspace between the support tube 15 and the measuring tube 4 and which comprises a permanent magnet 161 mounted on the measuring tube 4 and a coil 162, which is mounted on the support tube 15 and into which the permanent magnet 161 dips and in which the latter can be moved to and fro. A support frame can also be used instead of the support tube.

In FIG. 1, the vibration exciter 16 excites the measuring tube 4 to flexural vibrations in the plane of the drawing, and as a result the Coriolis forces effecting the abovementioned phase shift also occur in this plane.

Furthermore, a first and a second vibration sensor 17, 18 for the vibrations of the measuring tube 4 are arranged in the interspace between the measuring tube 4 and the support tube 15. The vibration sensor 17 and 18 is located between the end plate 13 and 14, respectively, and the vibration exciter 16, preferably at the same distance from said exciter, that is to say also at the same distance from the middle of the measuring tube 4.

Given a differing distance of the vibration sensors 17, 18 from the middle of the measuring tube 4, or given that their sensitivity is different from one another, in the case of the invention the asymmetry thereby caused in the sensor signals is compensated by the gain of a following amplifier; compare further below.

The vibration sensors 17 and 18 are electromagnetic vibration sensors which comprise a permanent magnet 171 and 181 mounted on the measuring tube 4 and a coil 172 and 182, respectively, which is mounted on the support tube 15 and into which the permanent magnet 171 and 181, respectively, dips and in which the latter can move to and fro. An analog signal x17 and x18 is produced by the vibration sensor 17 and 18, respectively.

Mounted on the end plate 13 is a first temperature sensor 19, which generates an analog signal representing the instantaneous temperature of the measuring tube. Mounted on the support tube 15 is a second temperature sensor 20, which generates an analog signal representing the instantaneous temperature of the support tube 15. Platinum resistors which are mounted, for example by bonding, on the end plate 13 and on the support tube 15, are preferably used as temperature sensors.

Finally, FIG. 1 also shows a housing 21 which is fixed to the support tube 15 and serves, inter alia, to protect leads which are connected to the vibration exciter 16 and to the vibration sensors 17, 18 but which, for reasons of clarity, are not represented.

The housing 21 is provided with a neck-like transition piece 22 to which an only partially illustrated electronics housing 23 is fixed for the purpose of holding the entire measuring and operating circuit of the mass flow meter.

For the case in which the transition piece 22 and the electronics housing 23 were to exert an unfavorable influence on the vibration response of the support tube 15, these can also be arranged separately from the mass flow sensor 1. There is then only one connecting lead between the electronics and the mass flow sensor 1.

Figure 2:
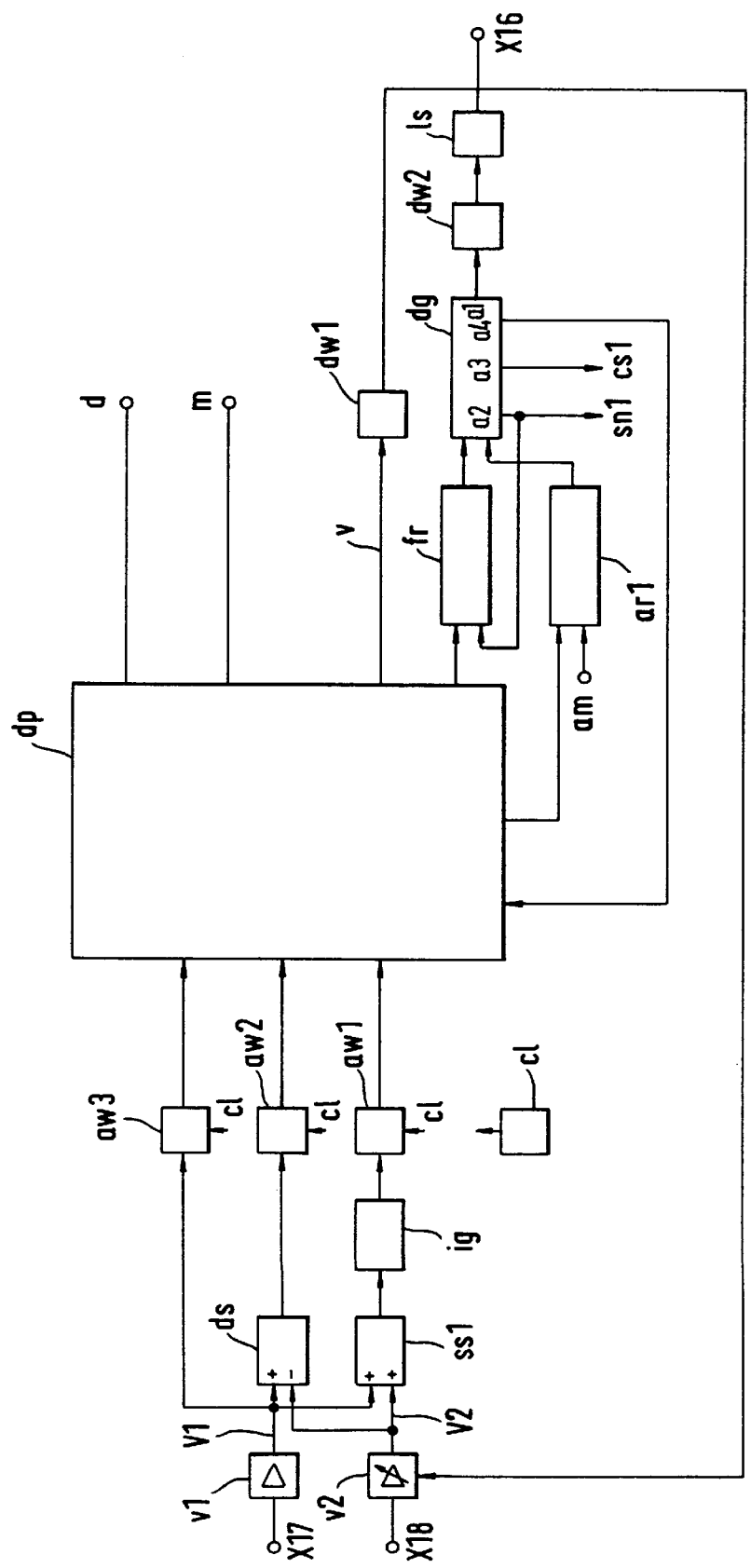
FIG. 2 shows, in the manner of a block diagram, a measuring and operating circuit for the mass flow meter of FIG. 1, for example.

FIG. 2 shows, in the manner of a block diagram, a measuring and operating circuit for mass flow meters having the various embodiments of measuring tubes which were mentioned above. The measuring and operating circuit comprises a measuring subcircuit and a exciting subcircuit. Since signals generated in the measuring subcircuit are required by the exciting subcircuit, the explanation begins with the firstmentioned subcircuit.

One of the two signals of the vibration sensors is fed on the input side to a first amplifier v1 having a permanently set gain; in FIG. 1, this is the signal X17 of the first vibration sensor 17. The first amplifier v1 supplies an output signal V1. The signal X18 of the second vibration sensor 18 is fed on the input side to a second amplifier v2, which has a gain control input, with the result that its gain is variable; the way in which this gain control is performed is explained further below. The second amplifier v2 supplies an output signal V2.

The amplifiers v1, v2 are followed by a first summing stage ss1 for the output signal of the first amplifier and that of the second amplifier. The output signal of the first summing stage ss1 is fed to an input of an integrating stage ig whose output signal has a phase shift of 90° with respect to the output signal of the first summing stage ss1.

The amplifiers v1, v2 are, furthermore, followed by difference stage ds, such that the output of the amplifier v1 is connected to its minuend input and the output of the amplifier v2 is connected to its subtrahend input.

The sections of the measuring subcircuit so far explained process analog signals and are therefore analog circuits.

A first analog-to-digital converter aw1 follows the integrating stage ig, a second analog-to-digital converter aw2 follows the difference stage ds, and a third analog-to-digital converter aw3 follows the first amplifier v1.

A clock oscillator cl generates a sampling signal which synchronously clocks the three analog-to-digital converters aw1, aw2, aw3 and whose frequency, the sampling frequency, does not need to be coupled to the vibration frequency of the measuring tube or of the measuring tubes, that is to say, in particular, is not an integral multiple or an integral part of this vibration frequency.

The sampling frequency is, furthermore, selected to be so high with respect to the highest occurring vibration frequency that no analog anti-alias filters are required in front of the analog-to-digital converters aw1, aw2, aw3; the invention thus explicitly dispenses with these anti-alias filters.

A digital processor dp has three inputs, of which one follows the first, one follows the second, and one follows the third analog-to-digital converters aw1, aw2, aw3, and which delivers a digital mass flow rate signal m at a first output and/or a digital density signal d at a second output.

The digital signals m, d can be transformed in the usual way into analog signals, as they are standardized in metrology, that is to say, for example, into a direct current whose intensity, varying between 4 mA and 20 mA, is proportional to the measured mass flow rate or proportional to the measured density, or into a pulse signal whose frequency is proportional to the measured mass flow rate or proportional to the measured density.

A digital gain control signal v is generated at a third output of the digital processor dp. This signal is fed to a first digital-to-analog converter dw1 and is converted thereby into an analog gain control signal V. An output of the first digital-to-analog converter dw1 at which the gain control signal V is present is connected to the gain control input of the second amplifier v2.

The result of this is to form a control circuit by means of which the amplitude of the output signal of the second amplifier v2 is rendered equal to the amplitude of the output signal of the first amplifier v1.

The already-mentioned exciting subcircuit comprises a digital generator dg, which has a frequency control input and an amplitude control input. Furthermore, the digital generator dg has a first output a1 which delivers a digital exciting signal, a second output a2, which delivers a digital first sine signal sn1, and a third output a3, which delivers a digital first cosine signal cs1.

A fourth output a4 of the digital generator dg delivers a digital signal representing the instantaneous vibration frequency, and is connected to a further input of the digital processor dp.

A digital frequency controller fr has a first input, a second input and an output. The first input is connected to the second output a2 of the digital generator dg, so that the first input is fed the digital first sine signal sn1. The second input of the frequency controller fr is connected to the fourth output of the digital processor dp, and its output is connected to the frequency control input of the digital generator dg.

A first digital amplitude controller ar1 has a first and a second input and an output. The first input is connected to the output of the first bandpass filter bp1. The second input is fed a digital amplitude-setting signal am, which can be set by the user of the mass flow meter and can be selected as a function of the abovementioned mechanical properties of the measuring tube or of the measuring tubes.

The output of the first digital amplitude controller ar1 is connected to the amplitude control input of the digital generator dg. The amplitude of the signal supplied by the first output a1 of the digital generator dg can thus be prescribed by the user, but remains constant after it is prescribed.

The first output a1, which has just been mentioned, of the digital generator dg is followed by second digital-to-analog converter dw2, which drives an analog output stage ls. The output signal X16 of this stage is fed to a vibration exciter, for example the vibration exciter 16 of FIG. 1.

Figure 3:
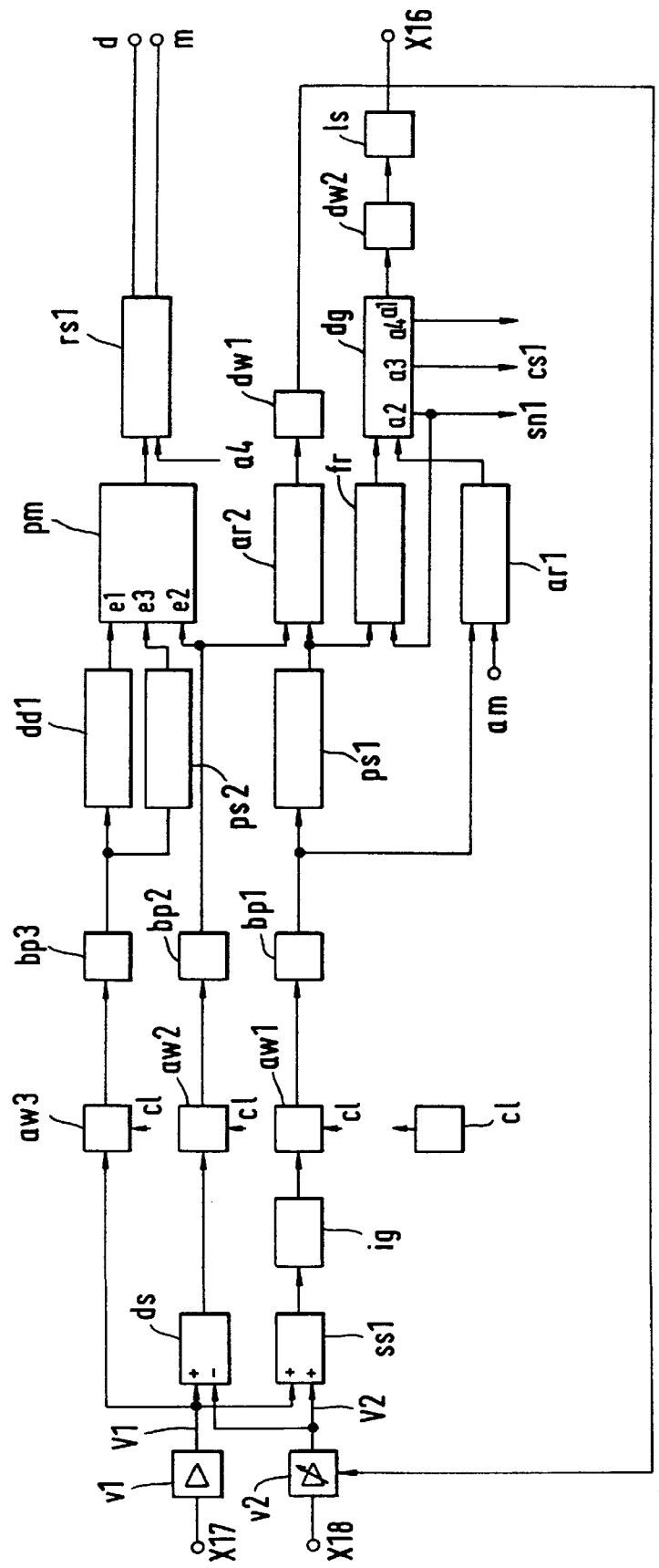
FIG. 3 shows, in the manner of a block diagram, an embodiment of the circuit of FIG. 2.

FIG. 3 shows, in the manner of a block diagram, a preferred embodiment of the digital processor dp of FIG. 2. A first digital bandpass filter bp1 follows the first analog-to-digital converter aw1, a second digital bandpass filter bp2 follows the second analog-to-digital converter aw2, and a third digital bandpass filter bp3 follows the analog-to-digital converter aw3.

The three bandpass filters bp1, bp2, bp3 are the same, and are thus all of identical design, and they have a lower and upper cut-off frequency, which is less than the lowest and higher than the highest occurring frequency of the vibrations of the measuring tube or of the measuring tubes, respectively.

This passband of the bandpass filters defined by the upper and the lower cut-off frequencies is thus, on the one hand, a function of the mechanical design of the measuring tubes; in particular, their length, diameter, wall thickness and material such as, for example, steel, titanium or zirconium, determine the passband. On the other hand, the passband is also determined by the fluid to be measured and the density thereof.

The passband is fixed for a specific dimensioning of the measuring tube 4 or of the measuring tubes in conjunction with the ensemble of the fluids approved for measurement using a particular Coriolis mass flow meter, with the result that the values of the lower and of the upper cut-off frequencies of the three bandpass filters bp1, bp2, bp3 are also known.

Since the sensor signals have a frequency which is equal to the instantaneous vibration frequency of the measuring tube or tubes, the output signals of the three bandpass filters bp1, bp2, bp3 also contain a digital signal representing the value of the instantaneous vibration frequency.

The third bandpass filter bp3 is followed by signal input of a first digital amplitude-measuring stage dd1, at whose output a digital signal occurs which is constant as long as the amplitude of the output signal of the third bandpass filter bp3 is constant, and which is identical to this amplitude. The first digital amplitude-measuring stage dd1 thus has the function of a digital stage whose output signal is equal to the amplitude of its input signal. As usual, amplitude is understood here to be the positive maximum value of a periodically variable signal.

A digital phase meter pm has a first, a second and a third input e1, e2, e3. The first input e1 is connected to the output of the first amplitude-measuring stage dd1, the second input e2 is connected to the output of the second bandpass filter bp2, and the third input e3 is connected to the output of the third bandpass filter bp3.

A second digital amplitude controller ar2 has a first input, which is connected to the output of a first digital 90°-phase-shifting and normalizing stage ps1; the latter follows the first bandpass filter bp1. A second input of the second amplitude controller ar2 is connected to the output of the second bandpass filter bp2. The abovementioned digital gain control signal v occurs at the output of the second digital amplitude controller ar2.

A first arithmetic stage rs1 serves to calculate the mass flow rate M and/or the density D of the fluid flowing in the measuring tube, and has a first input which is connected to the output of the phase meter pm. The abovementioned digital mass flow rate signal m can be tapped at a first output of the arithmetic stage rs, and the abovementioned digital density signal d can be tapped at a second output.

Figure 4:
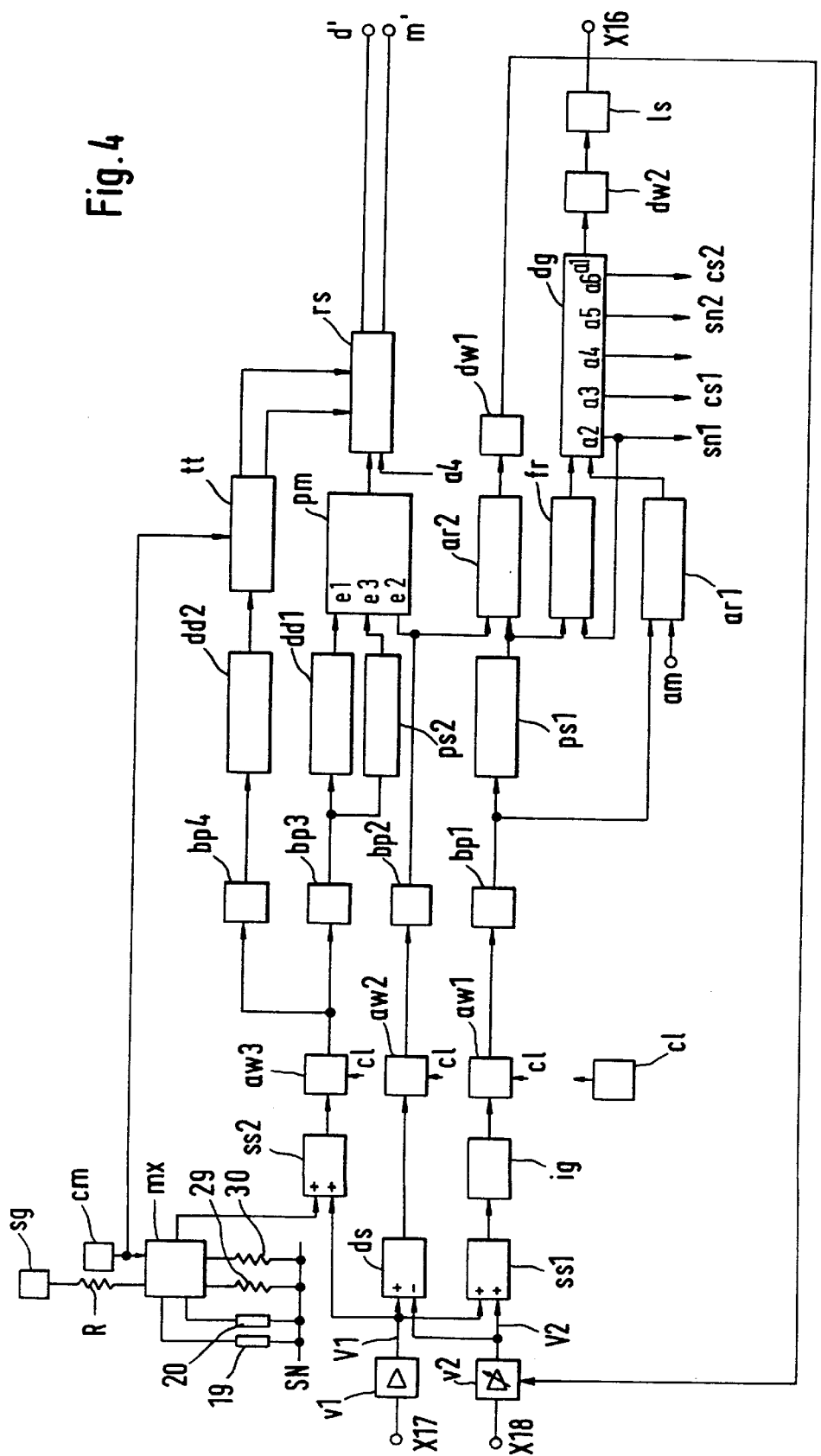
FIG. 4 shows, in the manner of a block diagram, a first development of the circuits of FIGS. 2 and 3.

FIG. 4 shows, in the manner of a block diagram, a development of the measuring and operating circuit for a mass flow sensor which contains the first temperature sensor 19 for measuring the measuring tube temperature, and the second temperature sensor 20 for measuring the support tube temperature. Furthermore, a first and a second temperature-independent reference resistor 29, 30 are provided. A first input/output path of a second summing stage ss2 is inserted between the first amplifier v1 and the third analog-to-digital converter aw3.

A generator sg for an analog sine signal whose frequency is outside the vibration frequency range of the measuring tube or of the measuring tubes is followed by a resistor R. The analog sine signal can thus be tapped only at the terminal of the resistor R averted from the generator sg.

A multiplexer mx is controlled by a clock generator cm, and cyclically switches through the first and the second temperature sensors 19, 20 as well as the first and the second reference resistors 29, 30 to a second input of the second summing stage ss2, thereby forming a respective voltage divider with the resistor R.

The temperature sensors 19, 20 and the reference resistors 29, 30 are thus interconnected sequentially and temporarily with the resistor R to form a voltage divider R-19, R-20, R-29, R-30. The connecting point with the resistor R is the tap of the voltage divider, which is switched through from the multiplexer mx to the second input of the second summing stage ss2.

The second input of the second summing stage ss2 is thus cyclically fed four analog sine signals of which one has an amplitude which depends on the temperature of the measuring tube, one has an amplitude which is dependent on the temperature of the support tube, one has an amplitude which is independent of temperature and depends only on the values of the resistors R, 29, and one has an amplitude which is independent of temperature and depends only on the values of the resistors R, 30.

The output of the third analog-to-digital converter aw3 is followed by narrow-band fourth bandpass filter bp4 whose passband comprises the frequency of the analog sine signal.

Although these analog sine signals are superimposed by means of the second summing stage ss2 on the amplified sensor signal X17, this signal is suppressed by means of the fourth bandpass filter bp4, with the result that only digital signals representing the four analog sine signals occur at its output.

In a comparable way, the four analog sine signals are suppressed by the third bandpass filter bp3, with the result that only a digital signal representing the amplified sensor signal X17 occurs at its output.

The fourth bandpass filter bp4 is followed by a signal input of a second digital amplitude-measuring stage dd2 at whose output a digital signal occurs which is constant as long as the amplitude of the output signal of the fourth bandpass filter bp4 is constant, and which is identical to this amplitude.

The second amplitude-measuring stage dd2 thus cyclically generates four digital signals which represent the digitized amplitudes of the four analog sine signals explained above.

One output of the second amplitude-measuring stage dd2 is connected to a signal input of a temperature signal separator stage tt of which a control input is connected to an output of the clock generator cm.

A digital signal corresponding to the temperature measured by the first temperature sensor 19 occurs at a first output of the temperature signal separator stage tt and is connected to a third input of the arithmetic stage rs.

A digital signal corresponding to the temperature measured by the second temperature sensor 20 occurs at a second output of the temperature signal separator stage tt and is connected to a fourth input of the arithmetic stage rs.

A temperature-compensated digital mass flow rate signal m' can be tapped at the first output of the arithmetic stage rs, and a temperature-compensated digital density signal d' can be tapped at its second output.

In the circuit of FIG. 4, the digital generator dg generates, in addition to the first sine signal sn1 and in addition to the first cosine signal cn1, a second digital sine signal sn2 at a fifth output a5, and a second digital cosine signal cn2 at a sixth output a6. The frequency of these two signals sn2, cn2 is equal to the frequency of the analog sine signal generated by the sine generator sg.

Figure 5:
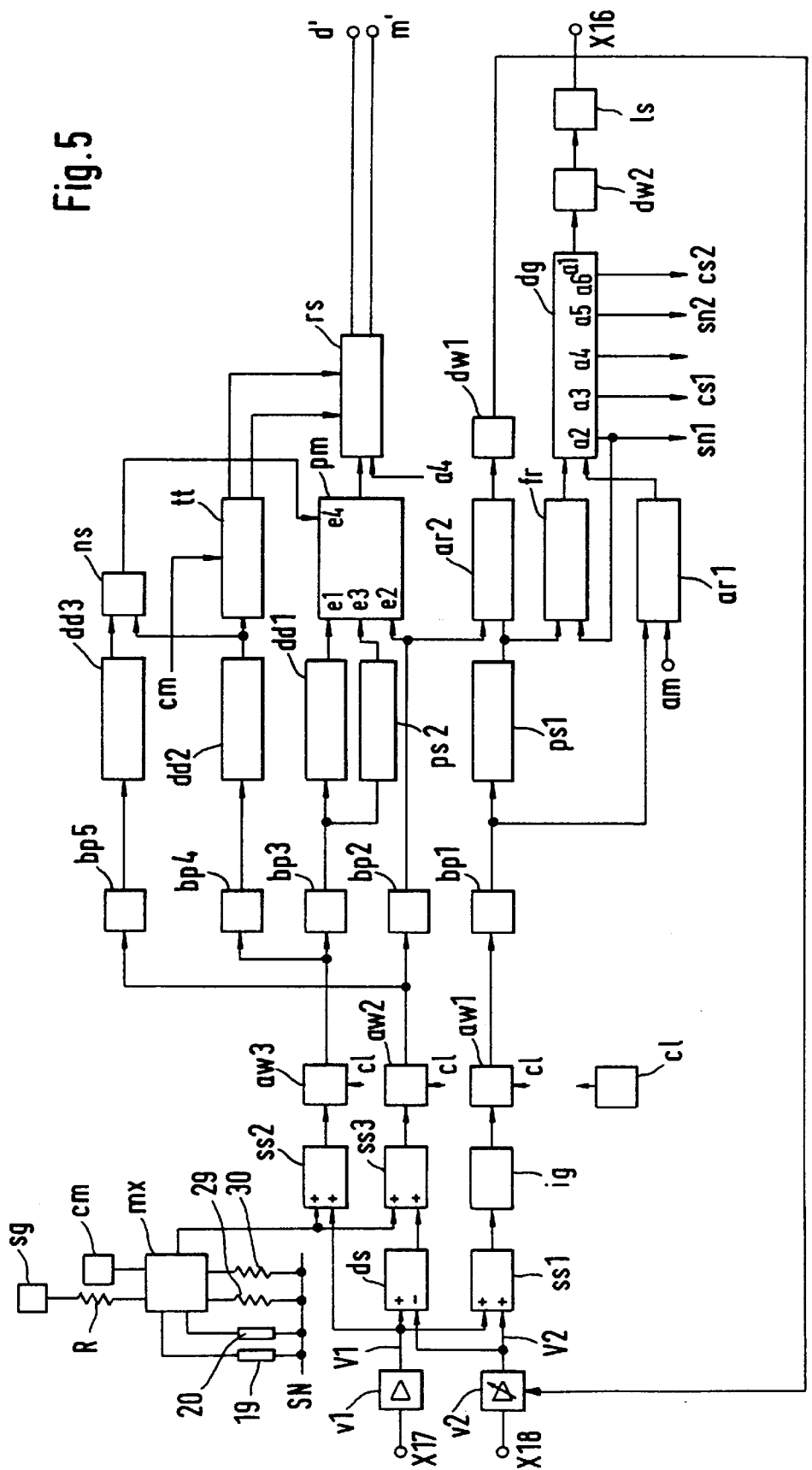
FIG. 5 shows, in the manner of a block diagram, the measuring and operating circuit of FIG. 4, supplemented by additional functions.

FIG. 5 shows, in the manner of a block diagram, a development of the measuring and operating circuit according to FIG. 4. A first input/output path of a third summing stage ss3 is inserted between the difference stage ds and the second analog-to-digital converter aw2. A second input of the third summing stage ss3 is connected to the output of the multiplexer mx.

A fifth bandpass filter bp5 is to the output of the second analog-to-digital converter aw2 and is of the same design as the fourth bandpass filter bp4. It is again only four digital signals representing the four analog sine signals of FIG. 3 which occur at the output of the fifth bandpass filter bp5.

The fifth bandpass filter bp5 is followed by a third digital amplitude-measuring stage dd3, which has the same function as the second amplitude-measuring stage dd2 according to FIG. 4.

The output of the third amplitude-measuring stage dd3 is connected to a first input of an asymmetry-measuring stage ns, and its second input is connected to the output of the second amplitude-measuring stage dd3. An output of the asymmetry-measuring stage ns is connected to a further signal input of the phase meter pm.

Asymmetries which can occur in the analog-to-digital converters aw2, aw3 and the analog stages connected in front of them are processed in a compensating fashion by means of the asymmetry-measuring stage ns and the stages connected in front of it in terms of signal flow.

Figure 6:
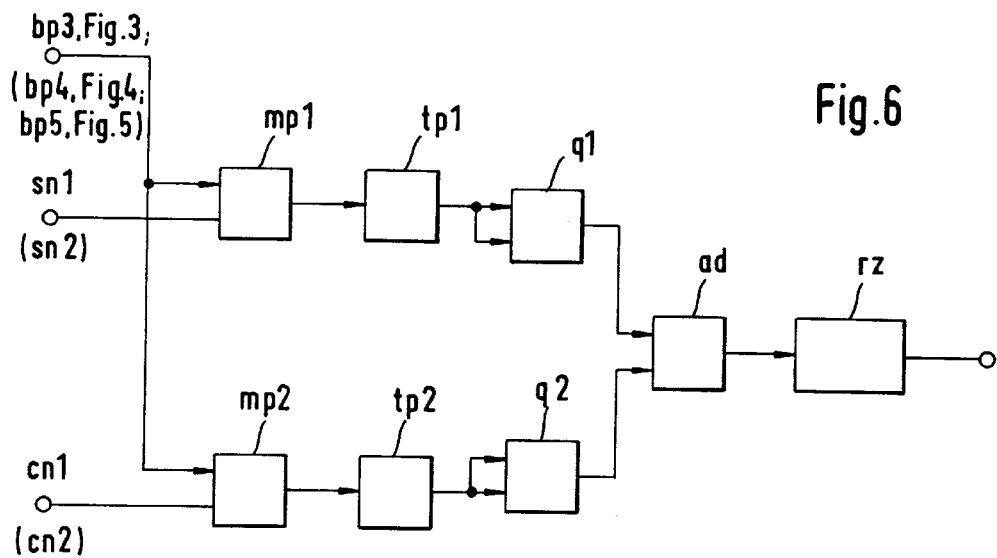
FIG. 6 shows, in the manner of a block diagram, a preferred design of amplitude-measuring stages.

In FIG. 6, in the manner of a block diagram, the preferred design of the amplitude-measuring stages used in the invention is shwon. The signal whose amplitude is to be measured is fed to a first input of a first multiplier mp1 and to a first input of a second multiplier mp2. This is the output signal of the third bandpass filter bp3 in the case of the first amplitude-measuring stage dd1 of FIGS. 3 to 5, the output signal of the fourth bandpass filter bp4 in the case of the second amplitude-measuring stage dd2 of FIGS. 4 and 5, and the output signal of the fifth bandpass filter bp5 in the case of the third amplitude-measuring stage dd3 of FIG. 5.

In the first amplitude-measuring stage dd1, the first digital sine signal sn1 generated by the digital generator dg of FIGS. 2 to 5 is fed to a second input of the first multiplier mp1, and the first digital cosine signal cn1 generated by the digital generator dg is fed to a second input of the second multiplier mp2.

By contrast, in the second and in the third amplitude-measuring stages dd2 and dd3, the second digital sine signal sn2 generated by the digital generator dg of FIGS. 4 and 5 is fed to the second input of the first multiplier mp1, and the second digital cosine signal cn2 generated by the digital generator dg is fed to the second input of the second multiplier mp2.

A first digital lowpass filter tp1 follows the first multiplier mp1, and a second digital lowpass filter tp2 follows the second multiplier mp2. The upper cut-off frequency of the two lowpass filters tp1, tp2 is far below the lowest vibration frequency to be expected for the measuring tube 4 or the measuring tubes.

There is a first squaring element q1 following the first lowpass filter tp1, and a second squaring element q2 following the second lowpass filter tp2. The output signal of the first squaring element q1 and the output signal of the second squaring element q2 are summed by an adder ad.

The output signal of the adder ad is fed to a root extractor rz, which forms therefrom as its output signal a digital signal which is equal to twice the square root of the output signal of the adder ad and which represents in digital form the amplitude of the output signals of the abovementioned bandpass filters.

Figure 7:
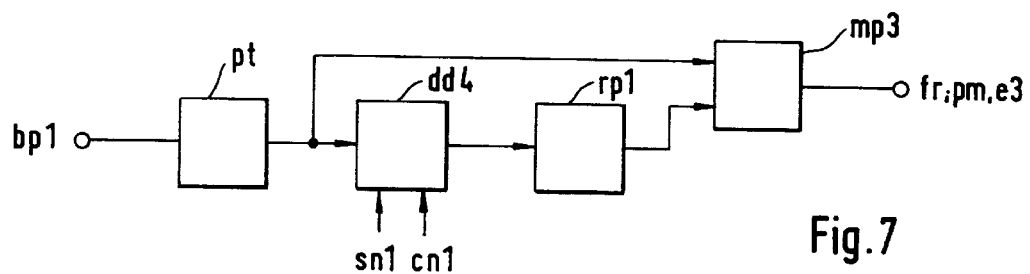
FIG. 7 shows, in the manner of a block diagram, a preferred design of the 90°-phase-shifting and normalizing stages.

In FIG. 7, in the manner of a block diagram, the preferred design of the 90°-phase-shifting and normalizing stages ps1, ps2 used in the invention is represented. The input of these stages, to which the output signal of the first bandpass filter bp1 or bp2 of FIGS. 3 to 5 is fed, is also the input of a pure 90°-phase-shifting section pt. This stage is followed by a fourth amplitude meter dd4, which is fed the first sine signal sn1 and the first cosine signal cn1.

The output signal of the fourth amplitude meter dd4 is fed to a first digital reciprocal-forming element rp1 which forms the associated reciprocal value from its input signal. The output signal of the 90°-phase-shifting section pt is fed to the first input of a third multiplier mp3, and the output signal of the first reciprocal-forming element rp1 is fed to the second input of the third multiplier mp3.

Occurring at the output of the third multiplier mp3 is that digital signal which is fed in FIGS. 2 to 5 to the second input of the frequency controller fr and is fed in FIGS. 3 to 5 to the first input of the second amplitude controller ar2 or to the third input e3 of the phase meter pm.

The normalization effected by the first reciprocal-forming element rp1 provides the output signal of the 90°-phase-shifting and normalizing stages ps1, ps2 with an amplitude representing the value of one.

Figure 8:
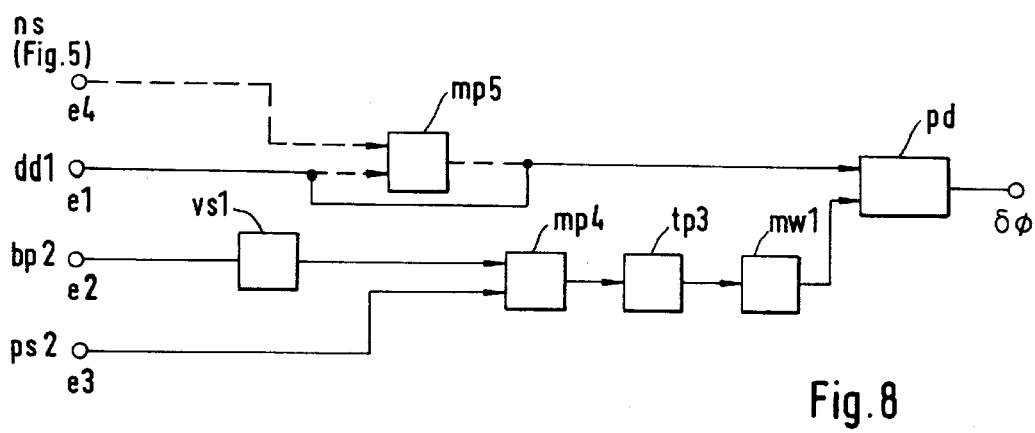
FIG. 8 shows, in the manner of a block diagram, a preferred design of a phase meter.

FIG. 8 shows, in the manner of a block diagram, the preferred design of the phase meter pm is shwon which is used in the invention and has the three inputs e1, e2, e3 already mentioned above. The first input e1 is connected to the output of the first amplitude-measuring stage dd1, the second input e2 is connected to the output of the second bandpass filter bp2, and the third input e3 is connected to the output of the second 90°-phase-shifting and normalizing stage ps2.

The second input e2 is connected to the input of a first time-delay stage vs1 whose time delay is equal to the time delay of the second 90°-phase-shifting and normalizing stage ps2. The first time-delay stage vs1 is connected to a first input of a fourth multiplier mp4, of which a second input is connected to the third input e3.

The fourth multiplier mp4 is followed by a third lowpass filter tp3, whose upper cut-off frequency is far below the smallest vibration frequency to be expected for the measuring tube 4 or the measuring tubes, and which is followed by a first averaging unit mw1. A first input of a phase difference stage pd is connected to the first input e1, and a second input of this stage is connected to the output of the first averaging unit mw1.

A supplement which holds for the circuit of FIG. 5 is further illustrated in dashes in FIG. 8. Inserted into the connection of the first input e1 to the first input of the phase difference stage pd is a fifth multiplier mp5, of which a first input is connected to the first input e1 and a second input is connected to the fourth input e4. As mentioned above, the latter is connected to the output of the asymmetry-measuring stage ns.

A digital signal which is exactly proportional to the phase difference dφ, mentioned at the beginning, of the signals X18, X19 of the two vibration sensors 18, 19 is generated by chosen for analog signals and lower case letters for digital signals.

The output signals V1, V2 of the two amplifiers v1, v2 are not only pure sinusoidal signals, but also contain interference signals and DC voltage components/offsets etc. It holds for them in a very general way referred to the middle of the measuring tube 4 or the measuring tubes that:

$$V1 = U_{17os} + U_{17}\sin(\Omega t - \phi/2) + \sum_{n=1}^{n=N} U_{17n}\sin(\Omega_n t + \alpha_n) \quad (1)$$

$$V2 = U_{18os} + U_{18}\sin(\Omega t + \phi/2) + \sum_{n=1}^{n=N} U_{18n}\sin(\Omega_n t + \beta_n) \quad (2)$$

The symbols of these equations have the following meanings:

$\Omega$: Angular frequency of the sensor signals; it holds that: $\Omega = 2\pi f$.

f: Frequency of the sensor signals X17, X18.

t: The time variable.

$U_{17os}$, $U_{18os}$: DC voltage offsets of the sensor signals X17, X18 and/or of the amplifiers v1, v2.

$U_{17}$, $U_{18}$: Amplitudes of the alternating component of V1 and V2, respectively.

φ: Phase shift of the sensor signals with respect to the vibration in the middle of the measuring tube.

N: Number of possible interference frequencies.

n: Sequential number of an interference frequency from the number N.

α, β: Phase shift of the nth interference frequency.

$U_{17n}$, $U_{18n}$: Amplitude of the nth interference frequency.

It holds for the digital signal u at the output of the bandpass filter bp2:

$$u \sim U_{17} - U_{18} = \{(U_{17} - U_{18})\cos(\phi/2)\} \sin \Omega t \pm \{(U_{17} + U_{18}) \sin(\phi/2)\} \cos \Omega t \quad (3)$$

The signal u no longer contains DC/offset terms, nor any terms with multiples of the frequency f.

Since, as explained, the sensor signals are controlled to equality of amplitude by the second amplitude controller ar2, the term $(U_{17}-U_{18})\cos(\phi/2)$ contained in equation (3) vanishes. For the same reason, the term $(U_{17}+U_{18})\sin(\phi/2)$ contained in equation (3) is simplified to: $2U_{17}\sin(\phi/2)$. Equation (3) therefore becomes:

$$u \pm 2\{U_{17}\sin(\phi/2)\}\cos \Omega t \quad (4)$$

It can be derived in a similar way that the output of the second 90°-phase-shifting and normalizing stage ps2 supplies a digital signal w:

$$w \sim \cos(\Omega t - \phi/2) \quad (5)$$

Signals u and w are multiplied by one another by the fourth multiplier mp4, and this can also be referred to as mixing, since the signals u, w are sine or cosine signals having the argument Ωt.

The output signal of the third lowpass filter tp3 no longer contains any sinΩt or cosΩt term, with the result that following the first averaging unit mp1 there occurs at one input of the phase meter pm a digital signal z which is a function of φ:

$$z \sim = U_{17} \sin \phi \quad (6)$$

The first input e1 of the phase meter pm is fed a signal representing the amplitude $U_{17}$ from the output of the first amplitude-measuring stage dd1. The phase meter pm firstly divides z by $U_{17}$. Then, φ is determined from the signal, which is now only proportional to sinφ by forming the arc-sine function. With regard to the required high accuracy, equating φ to sinφ, which is possible per se in the case of very small values of φ, is deliberately not made.

Figure 9:
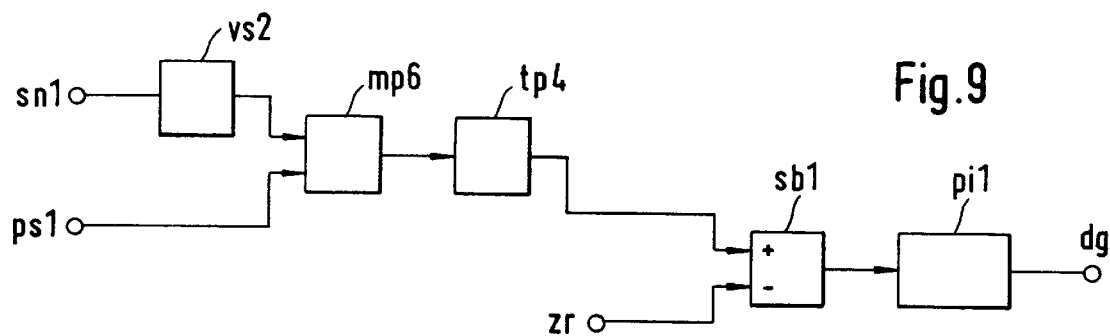
FIG. 9 shows, in the manner of a block diagram, a preferred design of a frequency controller.

In FIG. 9 in the manner of a block diagram the preferred design of the frequency controller fr used in the invention is shown. The first sine signal sn1 is fed to a second time-delay stage vs2 whose time delay is equal to the time delay of the first 90°-phase-shifting and normalizing stage ps1.

The output of the second time-delay stage vs2 is connected to the first input of a sixth multiplier mp6, whose second input is connected to the output of the 90°-phase-shifting and normalizing stage ps.

Connected to the output of the sixth multiplier mp6 is a fourth lowpass filter tp4, whose upper cut-off frequency is far below the smallest vibration frequency to be expected for the measuring tube 4 or the measuring tubes. A minuend input of a first subtractor sb1 is connected to the output of the fourth lowpass filter tp4.

A subtrahend input of the first subtractor sb1 is fed a digital signal zr which represents the desired value zero of the phase shift between the output signal of the first 90°-phase-shifting and normalizing stage ps1 and the signal at the second output of the digital generator dg.

The output of the first subtractor sb1 is connected to the input of a first PID controller pi1, whose output is connected to the frequency control input of the digital generator dg.

Figure 10:
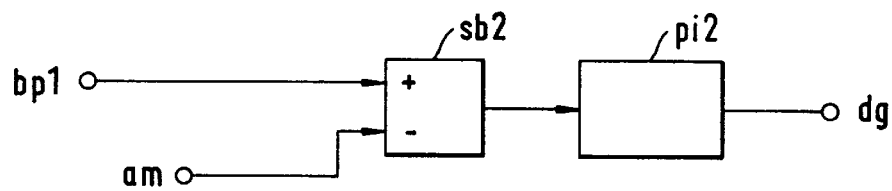
FIG. 10 shows, in the manner of a block diagram, a preferred design of a first amplitude controller.

In FIG. 10, in the manner of a block diagram, the preferred design of the first amplitude controller ar1 used in the invention is represented. The minuend input of a second subtractor sb2 is connected to the output of the first bandpass filter bp1, and the amplitude setting signal am is fed to its subtrahend input.

The output of the second subtractor sb2 is connected to the input of a second PID controller pi2, whose output is connected to the amplitude control input of the digital generator dg.

Figure 11:
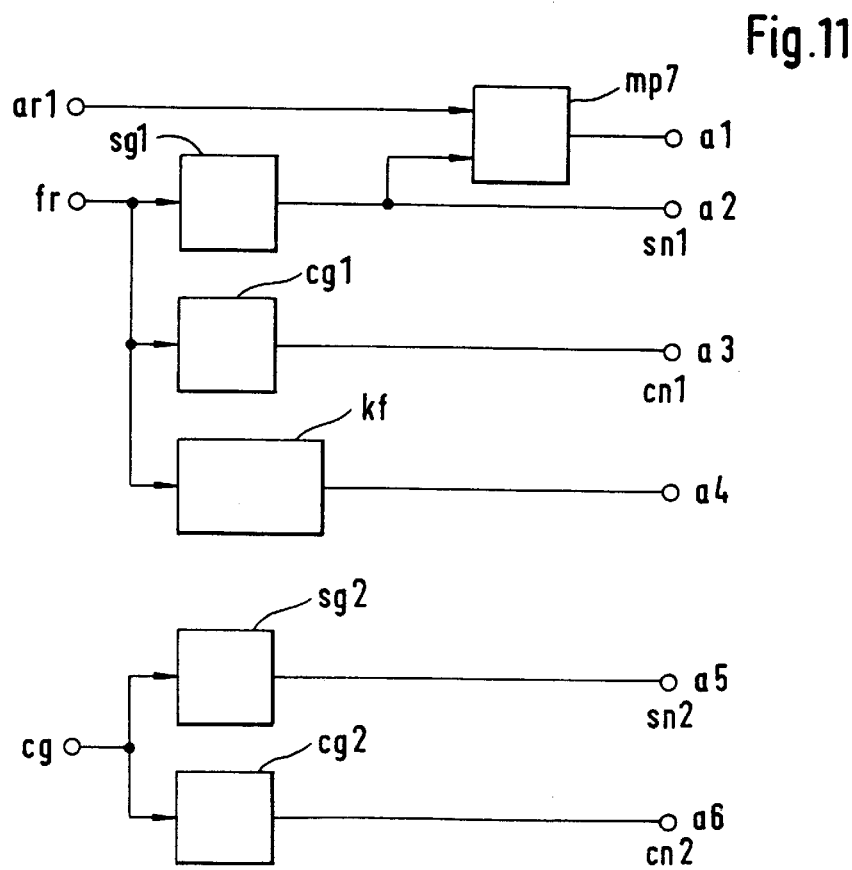
FIG. 11 shows, in the manner of a block diagram, a preferred design of a digital generator.

In FIG. 11, in the manner of a block diagram, the preferred design of the digital generator dg used in the invention is represented. The amplitude control input of this generator, which is connected to the output of the first amplitude controller ar1, is connected to a first input of a seventh multiplier mp7, whose output is the first output of the digital generator dg; the digital signal driving the second digital-to-analog converter dw2 occurs here.

The sine signal sn1 is also fed to a second input of the seventh multiplier mp7 by which the digital amplitude signal of the first amplitude controller ar1 is multiplied by the sine signal sn1, which is generated with a fixed amplitude.

Together with a frequency control input of a first digital cosine generator cg1, a frequency control input of a first digital sine generator sg1 is the abovementioned frequency control input of the digital generator dg, which is connected to the output of the frequency controller fr.

The digital signal at this output is a number which is exactly proportional to the instantaneous vibration angular frequency of the measuring tube 4 or the measuring tubes and contains the information on the frequency, and from which the first sine generator sg1 generates the first sine signal sn1, likewise mentioned above, and the first cosine generator cg1 generates the abovementioned first cosine signal cn1. The two signals sn1, cn1 thus always have a frequency which is exactly equal to the instantaneous vibration frequency of the measuring tube 4 or of the measuring tubes. The sine signal sn1 is present on the second output a2, and the signal cn1 is present on the third output a3.

In FIG. 11, the frequency control input is, furthermore, connected to the input of a stage kf which generates from the abovementioned vibration angular frequency signal a digital signal which contains only the information on the frequency associated with the angular frequency.

Finally, in FIG. 11 a digital signal cg which can be set by the user to the frequency of the analog sine generator sg explained above is fed to a frequency control input of a second digital sine generator sg2 together with a frequency control input of a second digital cosine generator cg2. The two generators sn2, cn2 can be implemented, for example, as sine or cosine tables stored in read-only memories.

From the digital signal cg, the second sine generator sg2 generates a second digital sine signal sn2, and the second cosine generator cg2 generates a second digital cosine signal cn2. The two signals sn2, cn2 thus always have a frequency which is equal to the frequency of the analog sine generator sg. The sine signal sn2 is present on the fifth output a5, and the signal cn2 is present on the sixth output a6.

Figure 12:
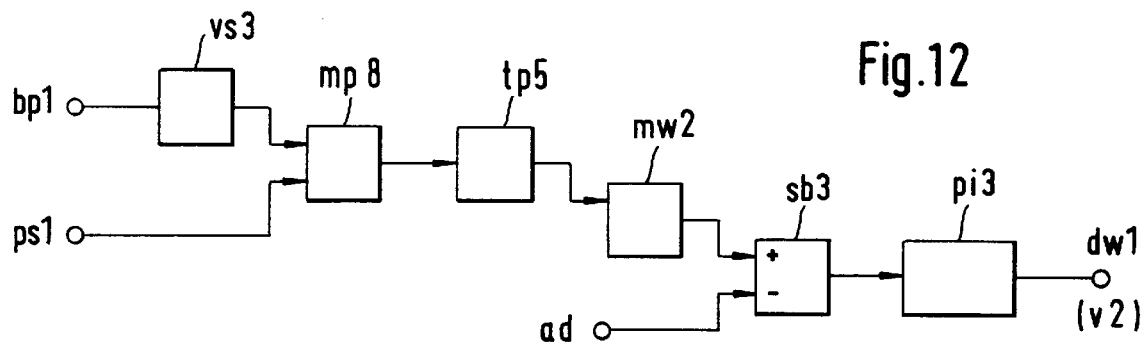
FIG. 12 shows, in the manner of a block diagram, a preferred design of a second amplitude controller.

In FIG. 12, in the manner of a block diagram, the preferred design of the second amplitude controller ar2 used in the invention is represented. The output of the first bandpass filter bp1 is connected to an input of a third time-delay stage vs3, whose delay time is equal to the delay time of the first 90°-phase-shifting and normalizing stage ps1.

A first input of an eighth multiplier mp8 is connected to the output of this time-delay stage vs3, and a second input of this multiplier mp8 is connected to the output of the second time-delay stage vs2. The eighth multiplier mp8 is followed by a fifth lowpass filter tp5, whose upper cut-off frequency is far below the smallest vibration frequency to be expected for the measuring tube 4 or the measuring tubes.

The fifth lowpass filter tp5 is followed by a second averaging unit mw2, to whose output a minuend input of a third subtractor sb3 is connected. A subtrahend input of the latter is fed a digital signal ad which represents the nominal value zero of the difference between the two sensor signals X17, X18.

The third subtractor sb3 is followed by a third PID controller pi3, at whose output the signal driving the first digital-to-analog converter dw1 occurs.

Figure 13:
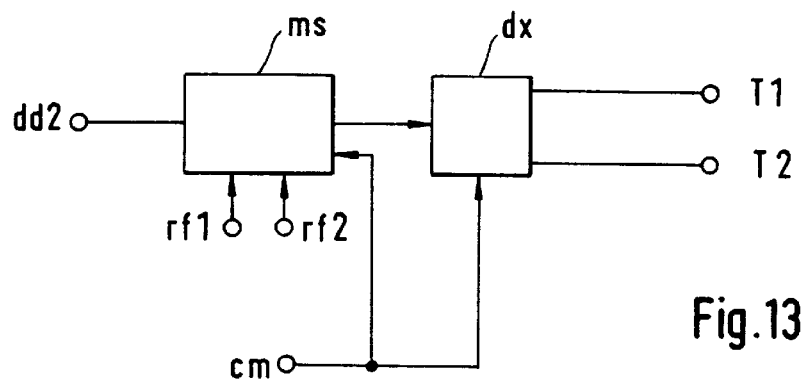
FIG. 13 shows, in the manner of a block diagram, a preferred design of a temperature-signal isolating stage.

In FIG. 13, in the manner of a block diagram, a preferred design of the temperature signal separator stage tt used in the invention is shown. An arithmetic stage ms is fed a digital signal rf1 and a digital signal rf2, which represent the particular implementation of the voltage divider ratios R-29 and R-30, respectively.

Furthermore, the arithmetic stage ms is fed as input signal the output signal of the second amplitude-measuring stage dd2, and as control signal the signal of the clock generator cm. When the signals representing the voltages at the taps of the voltage dividers R-29, R-30 occur in the input signal, a voltage/resistance polynomial is stored in an associated RAM with the support of the signals rf1, rf2.

If those signals representing the voltages at the taps of the voltage dividers R-19, R-20 which contain the information on the temperatures then appear in the input signal, the resistance signals associated with these (voltage) signals are determined by comparison with the aid of the voltage/resistance polynomial. These resistance signals are the signals T1, T2 representing the temperatures.

A demultiplexer dx controlled by the clock generator cm ensures that the signals T1, T2 are assigned to separate leads.

Figure 14:
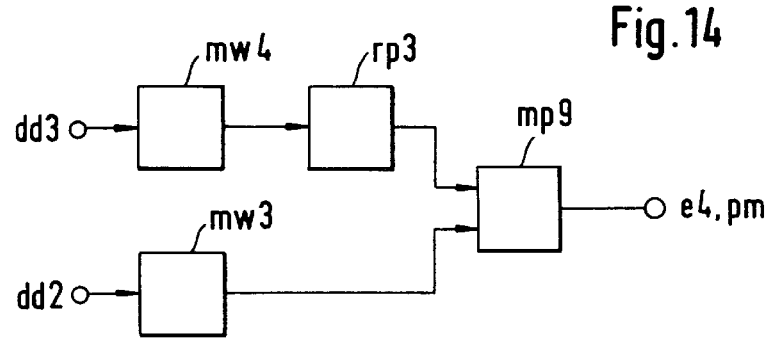
FIG. 14 shows, in the manner of a block diagram, a preferred design of an asymmetry-measuring stage.

In FIG. 14, in the manner of a block diagram a preferred design of the asymmetry-measuring stage ns used in the invention is shown. As has already been mentioned above, the first input of this stage is fed the output signal of the second amplitude-measuring stage dd2, and the second input is fed the output signal of the third amplitude-measuring stage dd3.

A first input of the asymmetry-measuring stage ns is also the input of a third averaging unit mw3. A second input of the asymmetry-measuring stage ns is also the input of a fourth averaging stage mw4, whose output is connected to the input of a second reciprocal-forming element rp2. The output signal of the third averaging unit mw3 is fed to a first input of a ninth multiplier mp9, whose second input is connected to the output of the second reciprocal-forming element rp2.

The output of the ninth multiplier mp9 is the output of the asymmetry-measuring stage ns and connected to the above-mentioned fourth input of the phase meter pm. The output signal of the ninth multiplier mp9 has a digital value representing the value of one when there is no asymmetry present.

What is claimed is:

1. A measuring and operating circuit of a Coriolis-type mass flow meter having a mass flow sensor which has at least one measuring tube through which a fluid to be measured flows, which vibrates in operation at a vibration frequency which is prescribed by said measuring tube's material and its dimensions but varied by the density of the fluid and which is equal to the instantaneous mechanical resonant frequency of the measuring tube or adjacent to this frequency, on which there are arranged a first and a second electromagnetic vibration sensor, spaced apart from one another in the flow direction, as well as a vibration exciter, and which is surrounded by a support frame or a support tube, each of the first and the second vibration sensors providing a signal, having a measuring subcircuit which comprises:
a first amplifier having a gain permanently set and amplifying the signal of the first vibration sensor, to produce an output signal
a second amplifier having a gain control input and amplifying the signal of the second vibration sensor, to produce an output signal
a first summing stage for the output signals of the first and second amplifiers, producing an output signal
an integrating stage which follows the first summing stage and whose output signal is phase-shifted by 90° with respect to the output signal of the first summing stage,
a difference stage for the output signals of the first and second amplifiers,
a first analog-to-digital converter following the integrating stage,
a second analog-to-digital converter following the difference stage,
a third analog-to-digital converter following the first amplifier,
a clock oscillator for generating a sampling signal which synchronously clocks the first, second and third analog-to-digital converters,
a digital processor which follows the first, second and third analog-to-digital converters and which generates at least one of a digital mass flow rate signal at a first output and a digital density signal at a second output as well as a gain control signal at a third output,
wherein said gain control signal is fed to a first digital-to-analog converter whose output is connected to the gain control input of the second amplifier, and
having an exciting subcircuit which comprises:
a digital generator
having a frequency control input,
having an amplitude control input,
having a first output for a digital exciting signal,
having a second output for a digital first sine signal,
having a third output for a digital first cosine signal, and
having a fourth output, for a digital signal representing the instantaneous vibration frequency, which is connected to an input of the digital processor,
a digital frequency controller
having a first input, which is connected to the second output of the digital generator,
having a second input, which is connected to the fourth output of the digital processor, and
having an output which is connected to the frequency control input of the digital generator,
a first digital amplitude controller
having a first input, which is connected to a fifth output of the digital processor, having a second input, which is fed a digital amplitude-setting signal, and having an output which is connected to the amplitude control input of the digital generator, and a second digital-to-analog converter, which follows the first output of the digital generator, and which drives an analog output stage feeding the vibration exciter.

2. A measuring and operating circuit according to claim 1 wherein the digital processor comprises:

a first, a second and a third digital bandpass filter, which follows the first, second and third analog-to-digital converters, respectively which are all of identical design, whose lower and upper cut-off frequency is lower than the lowest and higher than the highest occurring frequency of the vibrations of the measuring tube, respectively, and which deliver output signals which contain a digital signal representing the value of the instantaneous mechanical vibration frequency, a first digital amplitude-measuring stage following the third bandpass filter and having an output at which a digital signal occurs which is constant as long as the amplitude of the output signal of the third bandpass filter is constant, and which is identical to this amplitude, a first digital 90°-phase-shifting and normalizing stage following the first bandpass filter, a second digital 90°-phase-shifting and normalizing stage following the third bandpass filter, a digital phase meter having a first input, which follows the first amplitude-measuring stage, having a second input, which follows the second bandpass filter, and having a third input, which follows the second 90°-phase-shifting and normalizing stage, a second digital amplitude controller having a first input, which follows the first 90°-phase-shifting and normalizing stage, having a second input, which is connected to the output of the second bandpass filter, and having an output, which is connected to the input of the first digital-to-analog converter, and an arithmetic stage for calculating at least one of the mass flow rate signal and the density signal having a first input which is connected to the output of the phase meter, having a second input, which is connected to the fourth output of the digital generator, having a first output, at which the digital mass flow rate signal can be tapped, and having a second output, at which the digital density signal can be tapped.

3. A measuring and operating circuit according to claim 2 wherein the mass flow rate sensor comprises a first temperature sensor for measuring the temperature of the measuring tube, and a second temperature sensor for measuring the temperature of the support tube or of the support frame, and the measuring and operating circuit further comprises:

a first and second reference resistor, a second summing stage from which a first input/output path is inserted between the first amplifier and the third analog-to-digital converter, a generator for an analog sine signal whose frequency is outside the vibration frequency range of the measuring tube, and which is followed by a resistor, a multiplexer for switching through, in a fashion cyclically clocked by a clock generator, the first and second temperature sensors as well as the first and second reference resistors to a second input of the second summing stage, thereby forming a respective voltage divider with the resistor, a narrow-band fourth digital bandpass filter, which follows the output of the third analog-to-digital converter and whose passband comprises the frequency of the analog sine signal, a second digital amplitude-measuring stage, having a signal input which follows the fourth bandpass filter, and having an output at which a digital signal occurs which is constant as long as the amplitude of the output signal of the fourth bandpass filter is constant and which is identical to this amplitude, and a temperature signal separator stage, of which a signal input is connected to the output of the second amplitude-measuring stage, of which a control input is connected to the output of the clock generator, having a first output, at which a digital signal corresponding to the temperature measured by the first temperature sensor occurs and which is connected to a third input of the arithmetic stage, and having a second output, at which a digital signal corresponding to the temperature measured by the second temperature sensor occurs and which is connected to a fourth input of the arithmetic stage, at whose first output a temperature-compensated digital mass flow rate signal can be tapped, and at whose second output a temperature-compensated digital density signal can be tapped.

4. A measuring and operating circuit according to claim 1 wherein the mass flow rate sensor comprises a first temperature sensor for measuring the temperature of the measuring tube, and a second temperature sensor for measuring the temperature of the support tube or of the support frame, and the measuring and operating circuit further comprises:

a first and second reference resistor, a second summing stage from which a first input/output path is inserted between the first amplifier and the third analog-to-digital converter, a generator for an analog sine signal whose frequency is outside the vibration frequency range of the measuring tube, and which is followed by a resistor, a multiplexer for switching through, in a fashion cyclically clocked by a clock generator, the first and second temperature sensors as well as the first and second reference resistors to a second input of the second summing stage, thereby forming a respective voltage divider with the resistor, a narrow-band fourth digital bandpass filter, which follows the output of the third analog-to-digital converter and whose passband comprises the frequency of the analog sine signal, a second digital amplitude-measuring stage, having a signal input which follows the fourth bandpass filter, and having an output at which a digital signal occurs which is constant as long as the amplitude of the output signal of the fourth bandpass filter is constant and which is identical to this amplitude, and a temperature signal separator stage, of which a signal input is connected to the output of the second amplitude-measuring stage, of which a control input is connected to the output of the clock generator, having a first output, at which a digital signal corresponding to the temperature measured by the first temperature sensor occurs and which is connected to a third input of the arithmetic stage, and having a second output, at which a digital signal corresponding to the temperature measured by the second temperature sensor occurs and which is connected to a fourth input of the arithmetic stage, at whose first output a temperature-compensated digital mass flow rate signal can be tapped, and at whose second output a temperature-compensated digital density signal can be tapped.

5. A measuring and operating circuit according to claim 4 further comprising:

a third summing stage, from which a first input/output path is inserted between the difference stage and the second analog-to-digital converter and of which a second input is connected to the output of the multiplexer, a fifth digital bandpass filter, which is connected to the output of the second analog-to-digital converter and whose design is identical to that of the fourth bandpass filter, a third digital amplitude-measuring stage, having a signal input which follows the fifth bandpass filter, and an asymmetry-measuring stage having a dividend input connected to the output of the third amplitude-measuring stage, having a divisor input connected to the output of the second amplitude-measuring stage, and having an output connected to a fourth input of the phase meter.

\* \* \* \* \*

UNITED STATES PATENT AND TRADEMARK OFFICE
CERTIFICATE OF CORRECTION

PATENT NO. : 6,073,495
DATED : June 13, 2000
INVENTOR(S) : Dietmar Stadler

It is certified that error appears in the above-identified patent and that said Letters Patent is hereby corrected as shown below:

<u>Title page,</u>
The following Foreign Application Priority Data should be corrected:
Mar. 2, 1998 [EP] European Patent Off. .................... 98810174

Signed and Sealed this

Thirteenth Day of November, 2001

Attest:

*Nicholas P. Godici*

NICHOLAS P. GODICI
*Attesting Officer*     *Acting Director of the United States Patent and Trademark Office*